(12) United States Patent
Sakamoto

(10) Patent No.: US 8,662,124 B2
(45) Date of Patent: Mar. 4, 2014

(54) PRECURED TREAD FOR RETREADED TIRE AND RETREADED TIRE

(75) Inventor: Daisuke Sakamoto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 963 days.

(21) Appl. No.: 12/672,183

(22) PCT Filed: Jun. 30, 2008

(86) PCT No.: PCT/JP2008/061863
§ 371 (c)(1),
(2), (4) Date: Feb. 4, 2010

(87) PCT Pub. No.: WO2009/019942
PCT Pub. Date: Feb. 12, 2009

(65) Prior Publication Data
US 2011/0220255 A1    Sep. 15, 2011

(30) Foreign Application Priority Data
Aug. 8, 2007 (JP) .................................. 2007-206420

(51) Int. Cl.
*B60C 1/00* (2006.01)
*B60C 11/00* (2006.01)

(52) U.S. Cl.
USPC .................................... 152/209.5; 152/209.6

(58) Field of Classification Search
USPC .......................................... 152/209.5, 209.6
See application file for complete search history.

(56) References Cited

U.S. PATENT DOCUMENTS

| 5,225,011 A * | 7/1993 | Takino et al. ............... 152/209.5 |
| 5,868,880 A * | 2/1999 | Pouille et al. ............... 152/209.6 |
| 6,516,847 B1 * | 2/2003 | Amaddeo et al. .......... 152/209.5 |
| 7,398,808 B2 * | 7/2008 | Cole, III .................... 152/209.7 |

FOREIGN PATENT DOCUMENTS

| CN | 1137981 A | 12/1996 |
| CN | 1067340 C | 6/2001 |
| EP | 341187 A2 * | 11/1989 |
| EP | 662396 A1 * | 7/1995 |
| EP | 864447 A1 * | 9/1998 |
| FR | 2 741 838 A1 | 6/1997 |
| JP | 55-107404 U | 7/1980 |
| JP | 56-102702 U | 8/1981 |
| JP | 61-037503 A * | 2/1986 |
| JP | 09-295360 A | 11/1997 |
| JP | 2001-047815 A * | 2/2001 |
| JP | 2001-180229 A | 7/2001 |

(Continued)

OTHER PUBLICATIONS machine translation for Japan 2004-224278 (no date).*

(Continued)

*Primary Examiner* — Steven D Maki
(74) *Attorney, Agent, or Firm* — Sughrue Mion, PLLC

(57) ABSTRACT

The object is to provide a precured tread for a retreaded tire improving attachability to a base tire. In a strip-shaped precured tread 10 to be attached to a crown portion of a base tire 32 from which a tread has been removed, side tread rubbers 14 disposed in side regions CS on both sides of a central region CN are set to have JIS A hardness lower than that of a central tread rubber 12 disposed in the central region CN including a widthwise centerline C so as to improve attachability to a base tire.

2 Claims, 1 Drawing Sheet

(56) References Cited

FOREIGN PATENT DOCUMENTS

| JP | 2002-192912 A | | 7/2002 |
|---|---|---|---|
| JP | 2004-224278 A | * | 8/2004 |
| JP | 2004-224278 A | | 8/2004 |
| JP | 2006-273248 A | * | 10/2006 |

OTHER PUBLICATIONS machine translation for Japan 2001-047815 (no date).*
machine translation for Japan 2006-273248 (no date).*
International Search Report dated Sep. 9, 2008 (4 pages).
Chinese Office Action dated Mar. 31, 2012 in corresponding Chinese Patent Application No. 200880102274.4.
Chinese Office Action dated Sep. 20, 2012 issued in Chinese Patent Application No. 200880102274.4.
Extended European Search Report issued in the corresponding European Application No. 08777714.0 dated Oct. 27, 2011.

* cited by examiner

PRECURED TREAD FOR RETREADED TIRE AND RETREADED TIRE

TECHNICAL FIELD

The present invention relates to a precured tread for a retreaded tire and a retreaded tire, especially to a precured tread for a retreaded tire suitable for retreading a tire for a small truck and a retreaded tire retreaded using this precured tread for a retreaded tire.

RELATED ART

A retreaded tire is a tire retreaded in such a manner that a tread is removed from an used tire to form a base tire, a precured tread (vulcanized tread) having a tread pattern formed on its tread surface is attached to a crown portion of this base tire, and then the precured tread and the base tire are vulcanized in a vulcanization can to be adhered (see, for example, JP2004224278A, JP55107404U, JP56102702U).

When a tread is removed from an used tire, the tread is buffed not to damage tire frame members (a belt, a carcass and the like) so that the tread is not sometimes buffed to a sufficient position. The retreaded tire retreaded using such a base tire has thicker tread rubber than that of a new tire so that the amount of heat generated in the tread rubber is increased and the temperature of the tread rubber is easily raised. Therefore, there arise problems that durability, particularly high-speed durability is deteriorated because separation failure occurs due to decrease of adhesion in an adhesion interface between a base tire and a precured tread, belt separation failure occurs due to decrease of adhesion between a belt cord and coating rubber in a belt layer and the like.

In JP2004224278A and JP55107404U, the above-mentioned problems are solved by adopting a cap and base structure in which a precured tread consists of a cap rubber layer superior in abrasion resistance and a base rubber layer superior in low heat generation property.

DISCLOSURE OF THE INVENTION

Problems to be Solved by the Invention

When a base tire is buffed, it is preferable to provide a clearance between a belt portion and a buff line (a guide for a buffing process) so as not to damage the belt portion, especially layers covering the belt ends (belt end reinforcing layers) as mentioned above. However, there are some tires in which a lug groove in shoulder portion is deep and a rubber gauge between a groove bottom of the lug groove and a belt portion is formed thinly as is the case with a studless tire for a small truck. In this case, setting of a buff line in a shoulder portion is limited and a curvature radius R of a buffed surface of a shoulder portion of a base tire (hereinafter referred to as buff R) is sometimes small.

Even if a precured tread (generally consisting of hard rubber in consideration of abrasion resistance) having the same tread width as that of a new tire is tried to be attached to a base tire in which buff R of the shoulder portion is small, the end portion of the precured tread to be attached to the shoulder portion of the base tire is difficult to be smoothly curved along buff R of the shoulder portion and therefore, sometimes the precured tread cannot be precisely and completely attached to the base tire (in other words, attachability is low).

Therefore, a precured tread having generally narrower tread width than that of a new tire, in other words, a precured tread having narrow attaching surface width and narrow tread width is usually attached to a base tire having small buff R in a shoulder portion. However, a retreaded tire retreaded using such a precured tread has a problem that it is inferior to a new tire in appearance and abrasion resistance.

In case of a precured tread having a cap and base structure, since a base rubber layer is inferior to a cap rubber layer in abrasion resistance, the cap rubber layer covers the base rubber layer across the entire width of the base rubber layer. By adopting this structure, relatively hard rubbers superior in abrasion resistance are disposed on the both end sides of the precured tread. Accordingly, also in this case, as mentioned above, it is difficult to completely and precisely attach the precured tread to the base tire having small buff R of the shoulder portions.

In order to solve such problems, there is a precure tread in which a curved portion corresponding to buff R of a shoulder portion is beforehand formed in an attaching surface side of the precure tread. However, such precure tread cannot be used in a base tire having the other size, that is to say, common use with a base tire having the other size, which is an advantage of a precured tread will be difficult.

It is an object of the present invention to provide, in view of the above-mentioned fact, a precured tread for a retreaded tire capable of improving attachability to a base tire and a retreaded tire using this precured tread for a retreaded tire.

Means for Solving the Problem

In order to achieve the above-mentioned object, a precured tread for a retreaded tire according to a first aspect of the present invention is a strip-shaped precured tread for a retreaded tire to be attached to a crown portion of a base tire from which a tread is removed, wherein different types of tread rubbers are disposed in a central region including a centerline in a widthwise direction of the tread and side regions on both sides of the central region.

Next, the operation of the precured tread for a retreaded tire of the first aspect is explained.

In case that the precured tread for a retreaded tire is configured to be attached to a crown portion of the base tire so that, for example, the tread rubbers disposed in the side regions are softer than the tread rubber disposed in the central region, since the tread rubbers disposed in the side regions are soft, even if buff R of the shoulder portion of the base tire is small, the tread rubbers disposed in the side regions are precisely deformed (curved) along this buff R to be attached to the base tire.

Therefore, by adopting the above-mentioned configuration of the precured tread, it is possible to improve attachability of the precured tread to the base tire.

In addition, as mentioned above, by configuring the precured tread in such a manner that the tread rubbers disposed in the side regions are softer than the tread rubber disposed in the central region, it is possible to improve commoditizing with a base tire having the other tire size.

As mentioned above, by configuring the precured tread in such a manner that the tread rubbers disposed in the side regions are softer than the tread rubber disposed in the central region, it is possible to improve attachability to the base tire so that it is not necessary to use a precured tread having a generally narrow width as before.

Therefore, the retreaded tire retreaded using a precured tread having soft tread rubbers disposed in the side regions becomes superior in appearance and abrasion resistance to a conventional retreaded tire retreaded using a generally narrow precured tread.

A precured tread for a retreaded tire according to a second aspect of the present invention is the precured tread for a retreaded tire according to the first aspect, wherein the tread rubbers disposed in the side regions have JIS A hardness within a range between 25 degrees and 40 degrees and the tread rubber disposed in the central region has JIS A hardness of not less than 50 degrees.

Next, the operation of the precured tread for a retreaded tire of the second aspect is explained.

In case that the tread rubbers disposed in the side regions have JIS A hardness of less than 25 degrees, the tread rubbers disposed in the side regions are excessively soft in comparison with the tread rubber disposed in the central region so that it is likely that the tread rubbers disposed in the side regions are easy to be worn and that uneven wear is generated. On the other hand, in case that the tread rubbers disposed in the side regions have JIS A hardness of more than 40 degrees, the tread rubbers disposed in the side regions are excessively hard so that the tread rubbers are difficult to be deformed (curved) along buff R of the shoulder portions of the base tire and that attachability of the precured tread to the base tire cannot be sufficiently secured.

In addition, in case that the tread rubber disposed in the central region has JIS A hardness of less than 50 degrees, the tread rubber disposed in the central region is excessively soft so that it is likely that the tread rubber disposed in the central region is easy to be worn and that uneven wear is generated.

Therefore, the tread rubbers disposed in the side regions preferably have JIS A hardness within a range between 25 degrees and 40 degrees and the tread rubber disposed in the central region preferably has JIS A hardness of not less than 50 degrees.

A precured tread for a retreaded tire according to a third aspect of the present invention is the precured tread for a retreaded tire according to the first or second aspects comprising a base rubber layer disposed on an attaching surface side of the tread, extending to both sides across the centerline in the widthwise direction, having a width within a range between 80% and 95% of a width of the attaching surface and consisting of rubber having lower heat generation property than those of the tread rubbers disposed in the central region and the side regions.

Next, the operation of the precured tread for a retreaded tire of the third aspect is explained.

The retreaded tire retreaded using the precured tread for a retreaded tire of the third aspect has the base rubber layer comprising rubber having low heat generation property disposed on the attaching surface side (tread inner side of the retreaded tire) so as to restrain heating up of the precured tread by the amount of heat. As a result, it is possible to keep adhesion of an adhesion interface between the precured tread and the base tire and to maintain durability of the retreaded tire, particularly high-speed durability.

In addition, by setting the width of the base rubber layer within a range between 80% and 95% of the width of the attaching surface, uneven wear is unlikely to be generated in the retreaded tire retreaded using this precured tread because both end portions of the base rubber layer are not exposed to the surface of the tread.

In case that the width of the attaching surface is less than 80% of the width of the base rubber layer, increase in temperature of the precured tread cannot be effectively restrained because of the narrow width of the base rubber layer. On the other hand, in case that the width of the base rubber layer is more than 95% of the width of the attaching surface, the base rubber layer extends too much in the side regions so that rubbers disposed in the side regions will be hard.

Therefore, the base rubber layer preferably has the width within a range between 80% and 95% of the width of the attaching surface.

A retreaded tire according to a fourth aspect is a retreaded tire retreaded using the precured tread for a retreaded tire according to any one of the first to third aspects.

Next, the operation of the retreaded tire of the fourth aspect is explained.

The retreaded tire retreaded using the precured tread for a retreaded tire according to any one of the first to third aspects can improve appearance and abrasion resistance under appropriate and certain attaching of the precured tread to the base tire in comparison with a conventional retreaded tire retreaded using a generally narrow precured tread.

Effect of the Invention

As discussed above, the precured tread for a retreaded tire of the present invention has a great advantage of improving attachability to a base tire.

In addition, the retreaded tire retreaded using the precured tread for a retreaded tire of the present invention has a great advantage of improving appearance and abrasion resistance.

Figure 1:
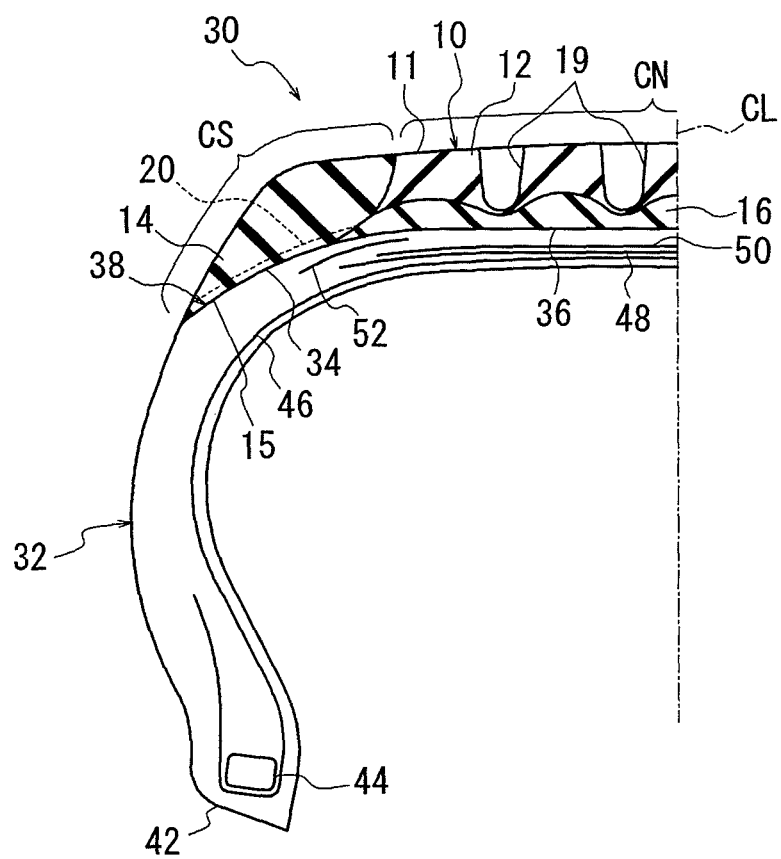
FIG. 1 is a half sectional view showing a half portion of a section along an axis of a retreaded tire according to the first embodiment.

| DESCRIPTION OF REFERENCE NUMERALS | |
|---|---|
| 10 | precured tread (precured tread for a retreaded tire) |
| 12 | central tread rubber (tread rubber disposed in a central region) |
| 14 | side tread rubber (tread rubber disposed a side region) |
| 15 | attaching surface |
| 16 | base rubber layer |
| 30 | retreaded tire |
| 32 | base tire |
| W1 | width (width of base rubber layer) |
| W2 | width (width of tread surface) |
| C | widthwise centerline |
| CL | tire equatorial plane |
| CN | central region |
| CS | side region |

BEST MODE FOR CARRYING OUT THE INVENTION

Hereinafter, the first embodiment of a precured tread for a retreaded tire of the present invention and an embodiment of a retreaded tire retreaded using the precured tread for a retreaded tire will be described in detail with reference to the drawings.

A retreaded tire 30 of this embodiment is a studless tire for a small truck, which has been retreaded using a precured tread for a retreaded tire of the present invention (hereinafter referred to as merely precured tread 10).

Figure 2:
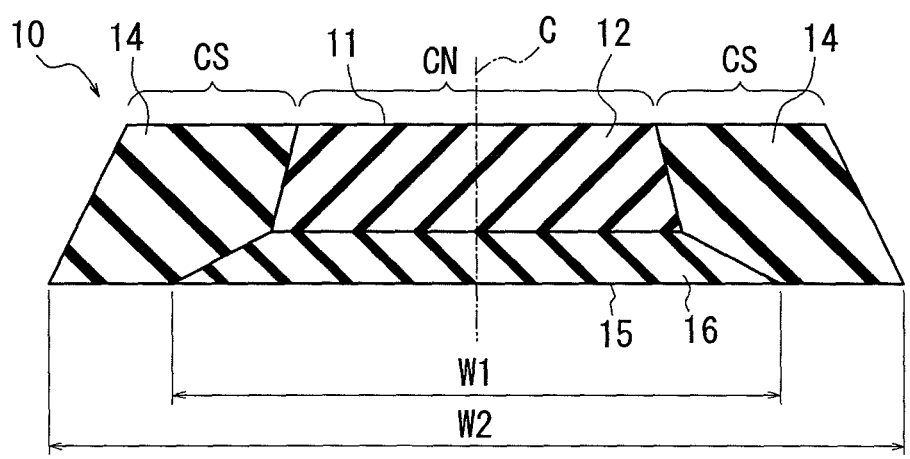
FIG. 2 is a schematic widthwise sectional view of a precured tread for a retreaded tire according to the first embodiment.

The precured tread 10 is a strip-shaped vulcanized tread having a generally trapezoidal widthwise section as shown in FIG. 2. The precured tread 10 has a tread pattern (main grooves 19 for drainage, a lug groove 20 and the like) in a portion to be a tread surface 11 (upper surface in FIG. 2). The main grooves 19 extend in the longitudinal direction of the precured tread 10 (tire circumferential direction) and the lug groove 20 extends in the width direction of the precured tread 10 (tire widthwise direction).

In addition, the precured tread 10 comprises a central tread rubber 12 disposed in a central region CN including a widthwise centerline C, side tread rubbers 14 disposed in side regions CS on both sides of the central region CN and a base rubber layer 16 disposed in an attaching surface 15 side (lower surface side in FIG. 2.) As shown in FIG. 2, an angle formed between a side of the central region abutting one of the corresponding side regions and a side of the central region abutting the base rubber layer in cross section thereof is smaller than 90°.

The central tread rubber 12 is disposed at least on the tread surface 11 side and both end surfaces thereof in the widthwise direction are adjacent to the side tread rubbers 14. The central tread rubber 12 has JIS A hardness of preferably not less than 50 degrees and more preferably within a range between 50 degrees and 75 degrees.

The side tread rubbers 14 are disposed at least on the tread surface 11 side and cover both end surfaces of the base rubber layer 16 in the widthwise direction. In addition, the side tread rubbers 14 are set to have lower JIS A hardness than that of the central tread rubber 12. In addition, the side tread rubbers 14 preferably have JIS A hardness within a range between 25 degrees and 40 degrees.

The base rubber layer 16 extends to both sides across the widthwise centerline C and its surface in the tread surface 11 side is adjacent to the central tread rubber 12 and the side tread rubbers 14. The base rubber layer 16 preferably has the width W1 within a range between 80% and 95% of the width W2 of the attaching surface 15.

In addition, the base rubber layer 16 is composed of rubber having lower heat generation property than those of the central tread rubber 12 and the side tread rubbers 14.

In this embodiment, the rubber of the base rubber layer 16 is set to have a lower loss tangent (tan δ) than those of the central tread rubber 12 and the side tread rubbers 14. More specifically, it is preferable to set a loss tangent of the rubber of the base rubber layer 16 within a range between 0.06 and 0.12 at 60 degrees Celsius. In addition, it is preferable to set the thickness of the base rubber layer 16 so that the base rubber 16 is not exposed to the tread surface even in the end of wear life of the precured tread 10.

In addition, the central region CN of the precured tread 10 of this embodiment corresponds to a tread central portion of a crown portion of a base tire to which the precured tread 10 is to be attached and the side regions CS correspond to shoulder portions of the crown portion of this base tire.

Next, a method of retreading an used studless tire for a small truck using the precured tread 10 to produce a retreaded tire 30 is explained.

At first, a tread of an used studless tire for a small truck is buffed along a buff line to form a base tire 32.

The buff line is set to provide a clearance with respect to a belt portion (belts 48, 50 as described below) and a layer of the studless tire for a small truck so as not to damage them in a buffing process.

Next, the configuration of a buffed base tire 32 of this embodiment is explained. This base tire 32 comprises a pair of bead portions 42, bead cores 44 embedded in these bead portions 42, a carcass ply 46 toroidally extending from one of the bead cores 44 to the other with its end portions being turned around the bead cores 44, two belts (an inner belt 48 and an outer belt 50) disposed on the radially outer side of the carcass ply 46 and layers 52 covering the end portions of these belts 48, 50 as shown in FIG. 1.

In addition, this base tire 32 is buffed in such a manner that a curvature radius of the shoulder portion 34 of a buffed surface 38 (a part of an outer circumferential surface) of the crown portion side is smaller than that of the tread central portion 36 and particularly a curvature radius corresponding to the layer 52 is the smallest.

Next, as shown in FIG. 1, the attaching surface 15 of the precured tread 10 is attached to the buffed surface 38 of the base tire 32. In this state, the widthwise centerline C of the precured tread 10 agrees with the tire equatorial plane CL of the base tire 32.

The precured tread 10 is pressed to the base tire 32 so that the attaching surface 15 of the precured tread 10 is completely attached to the buffed surface 38 of the base tire 32. The harder central tread rubber 12 is disposed in the tread central portion 36 where buff R of the base tire 32 is large and the softer side tread rubber 14 is disposed in the shoulder portion 34 where buff R of the base tire 32 is small so that the central tread rubber 12 is attached to the buffed surface 38 while deformed (curved) along buff R of the tread central portion 36 and the side tread rubber 14 is attached to the buffed surface 38 while deformed (curved) along buff R of the shoulder portion 34.

In addition, an unvulcanized cushion rubber layer for adhering the precured tread 10 and the base tire 32 is disposed between the attaching surface 15 of the precured tread 10 and the buffed surface 38 of the base tire 32 although it is not illustrated. This unvulcanized cushion rubber layer can strongly bond the precured tread 10 and the base tire 32 by being vulcanized.

Although in this embodiment the unvulcanized cushion rubber layer is used, the present invention need not to be limited to this configuration but adhesive agent for a rubber and the like may be used in substitution for the unvulcanized cushion rubber layer.

The precured tread 10 is attached to the base tire 32, loaded with a vulcanization can and vulcanized under high temperature and pressure so that the precured tread 10 is adhered to the base tire 32 and a retreaded tire 30 is molded. That is to say, a studless tire for a small truck is retreaded using the precured tread 10 to become the retreaded tire 30.

Next, the operations of the precured tread 10 and the retreaded tire 30 with the use of this precured tread 10 are explained.

In case that the precured tread 10 is attached to the buffed surface 38 of the base tire 32, since the side tread rubber 14 is softer (JIS A hardness is lower) than the central tread rubber 12, even if buff R of the shoulder portion 34 of this base tire 32 is small, the side tread rubber 14 can be attached while being deformed along this buff R.

Thus, by configuring the precured tread 10 so that the side tread rubber 14 is softer than the central tread rubber 12, it is possible to improve attachability of the precured tread 10 to the base tire 32. In this way, for example, even when the precured tread 10 has the tread width equal to or more than that of a studless tire for a new small truck, the precured tread 10 can be attached to the base tire 32.

In addition, it is possible to improve commoditizing with a base tire having different tire size but the same tread width.

In case that the side tread rubber 14 of the precured tread 10 has JIS A hardness of less than 25 degrees, the side tread rubber 14 is excessively soft in comparison with the central tread rubber 12 so that it is likely that the side tread rubber 14 is easy to be worn and that uneven wear is generated. On the other hand, in case that the side tread rubber 14 has JIS A hardness of more than 40 degrees, the side tread rubber 14 is excessively hard so that the side tread rubber 14 is difficult to be deformed (curved) along buff R of the shoulder portion 34 of the base tire 32 and that attachability of the precured tread 10 to the base tire 32 cannot be sufficiently secured.

In addition, in case that central tread rubber 12 has JIS A hardness of less than 50 degrees, the central tread rubber 12 is excessively soft so that it is likely that the central tread rubber 12 is easy to be worn and uneven wear is generated.

Therefore, the side tread rubber 14 preferably has JIS A hardness within a range between 25 degrees and 40 degrees and the central tread rubber 12 preferably has JIS A hardness of not less than 50 degrees.

This retreaded tire 30 has the base rubber layer 16 comprising rubber having low heat generation property disposed on the attaching surface 15 side of the precured tread 10 (tread inner side of the retreaded tire 30) so as to restrain heating up of the precured tread 10, to keep adhesion of an adhesion interface between the precured tread 10 and the base tire 32 and to maintain durability of the retreaded tire 30.

In addition, since the width W1 of the base rubber layer 16 is set within a range between 80% and 95% of the width W2 of the attaching surface 15, in this retreaded tire 30 both end portions of the base rubber layer 16 are not exposed to the tread surface and uneven wear is unlikely to be generated.

In case that the width W2 of the attaching surface is less than 80% of the width W1 of the base rubber layer 16, increase in temperature of the precured tread 10 cannot be effectively restrained because of the narrow width W1 of the base rubber layer 16. On the other hand, in case that the width W1 of the base rubber layer 16 is more than 95% of the width W2 of the attaching surface 15, the base rubber layer 16 extends too much in the side regions so that rubbers disposed in the side regions will be hard.

Therefore, the base rubber layer 16 preferably has the width W1 within a range between 80% and 95% of the width W2 of the attaching surface 15.

Such retreaded tire 30 retreaded using the precured tread 10 can improve appearance and abrasion resistance in comparison with a conventional retreaded tire retreaded using a generally narrow precured tread and obtain substantially similar appearance and abrasion resistance to those of a new tire.

In the above-mentioned embodiment, the case that a studless tire for a small truck is retreaded using the precured tread 10 of the present invention to form a retreaded tire 30 has been described. However, the present invention needs not to be limited to this embodiment but the precured tread 10 of the present invention can be applied to any tires other than a studless tire for a small truck such as an all-season tire for a small truck, an aircraft tire and the like.

It goes without saying that the present invention is not limited to the above-mentioned embodiment but various changes may be made within the scope of claims.

EXAMPLE

In order to confirm the effect of the present invention, the inventor produces one kind of retreaded tire (hereinafter referred to as Example tire) in such a manner that an used tire (tire size: 225/75R16 118/116L) is buffed to form a base tire and a precured tread according to the present invention is attached to thus-formed base tire. The inventor also produces two kinds of retreaded tires (hereinafter referred to as Comparative Example tires) each using a precured tread as a comparative example and two kinds of retreaded tires (hereinafter referred to as Conventional Example tires) each using a precured tread as a conventional example. The inventor conducts following tests using these example retreaded tires as to high-speed durability, abrasion resistance and uneven wear resistance and shows the results in Table 1.

In addition, the inventor evaluates retread properties of the example precured tires and shows the results in Table 1.

It is noted that each example retreaded tire is mounted on a rim of 6J and applied with the internal pressure of 600 kpa to be tested.

(Retread Properties)
The tread width of each example precured tread which can be attached to a base tire is measured and shown in Table 1 in an index value with the tread width of a new tire being defined as a standard (100). The closer value to 100 means the closer tread width of a new tire.

(High-Speed Durability)
A high-speed drum durability test compliant with JIS is conducted and the speed at the time of trouble is indexed with the value of Conventional Example tire 1 which is a normal retreaded tire being defined as a standard (100). The larger value means the better results.

(Abrasion Resistance/Uneven Wear Resistance)
Each example retreaded tire is mounted on a 3-ton truck and then the mean of wear abrasion resistance of a rear tire is calculated by measuring a remaining groove depth after actual running under a condition of the travelling distance of 50,000 km and the travelling speed of about 60 km/h. The amount of abrasion is indexed with that of Conventional Example tire 1 which is a normal retreaded tire being defined as a standard (100).

As to uneven wear resistance, the amount of wear difference between the central portion and the shoulder portion is compared in index values. The amount of uneven wear is similarly indexed with that of Conventional Example tire 1 being defined as a standard (100). The larger value means the better results.

TABLE 1

|  | Conventional Example 1 | Conventional Example 2 | Comparative Example 1 | Comparative Example 2 | Example |
|---|---|---|---|---|---|
| Tread structure | CAP only | CAP/BASE | CAP/BASE | CAP/BASE | CAP/BASE |
| Hardness of central tread rubber (measurement value: JIS A hardness) | Hard (65) | Hard (65) | Soft (35) | Hard (65) | Hard (65) |
| Hardness of side tread rubber (measurement value: JIS A hardness) | Hard (65) | Hard (65) | Soft (35) | Soft (20) | Soft (35) |
| Retread properties (index) | 75 | 75 | 96 | 100 | 96 |
| High-speed durability (index) | 100 | 120 | 116 | 116 | 116 |

TABLE 1-continued

|  | Conventional Example 1 | Conventional Example 2 | Comparative Example 1 | Comparative Example 2 | Example |
|---|---|---|---|---|---|
| Abrasion resistance (index) | 100 | 100 | 108 | 124 | 124 |
| Uneven wear resistance (index) | 100 | 100 | 100 | 95 | 112 |

It is found from the results of Table 1 that Example tire is superior to Conventional Example tire 1 in all test items.

Conventional Example tire 2 is superior in high-speed durability because both of the central tread rubber and the side tread rubbers have high hardness. However, other test items of Conventional Example tire 2 are identical to those of Conventional Example tire 1. Therefore, it is found that Example tire is superior to Conventional Example tire 2.

Comparative Example tire 1 is superior in retread properties because both of the central tread rubber and the side tread rubbers have low hardness but inferior in abrasion resistance and uneven wear resistance to Example tire because hardness of the central tread rubber of Comparative Example tire 1 is low.

Comparative Example tire 2 is superior in retread properties and abrasion resistance because the side tread rubbers have the lowest hardness but inferior in uneven wear resistance to Example tire 1 because the hardness of the side tread rubber of Comparative Example tire 2 is excessively low.

In summary, it is found that Example tire is superior in at least two of high-speed durability, abrasion resistance and uneven wear resistance, which are important for a retreaded tire, to Conventional Example tires 1, 2 and Comparative Example tires 1, 2.

The invention claimed is:

1. A strip-shaped precured tread for a retreaded tire to be attached to a crown portion of a base tire from which a tread is removed, wherein
different types of tread rubbers are disposed in a central region including a centerline in a widthwise direction of the tread and side regions on both sides of the central region; and a base rubber layer disposed on an attaching surface side of the tread, extending to both sides across the centerline in the widthwise direction, having a width within a range between 80% and 95% of a width of the attaching surface and consisting of rubber having lower heat generating property than those of the tread rubbers disposed in the central region and the side regions,
wherein
the tread rubbers disposed in the side regions have JIS A hardness within a range between 25 degrees and 40 degrees, exclusive of 40 degrees and
the tread rubber disposed in the central region has JIS A hardness of not less than 50 degrees, wherein an angle formed between a side of the central region abutting one of the corresponding side regions and a side region of the central region abutting the base rubber layer in a cross sectional thereof is smaller than 90°.

2. A retreaded tire retreaded using the precured tread for a retreaded tire according to claim 1.

* * * * *